Jan. 30, 1934.　　　　F. H. BENGE　　　　1,945,412
MECHANISM FOR TREATING LAMINATED BODIES
Original Filed April 9, 1929　　5 Sheets-Sheet 2
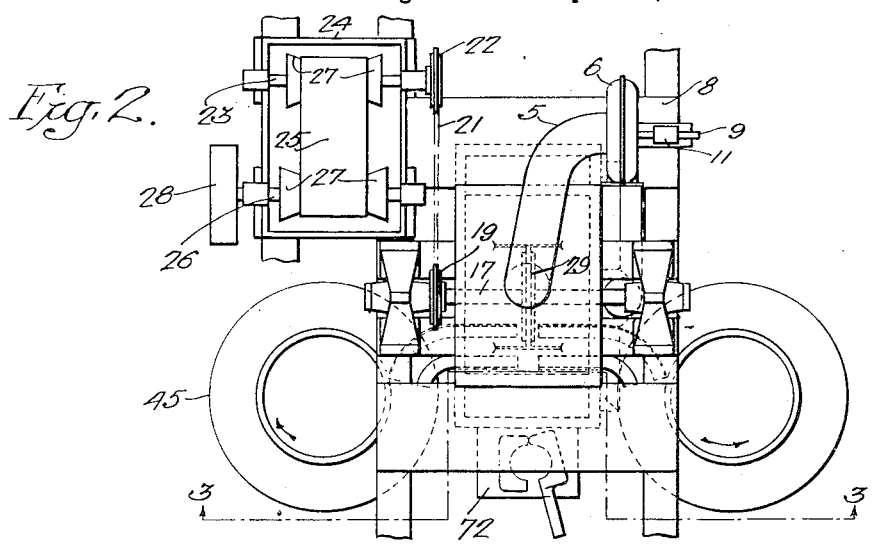
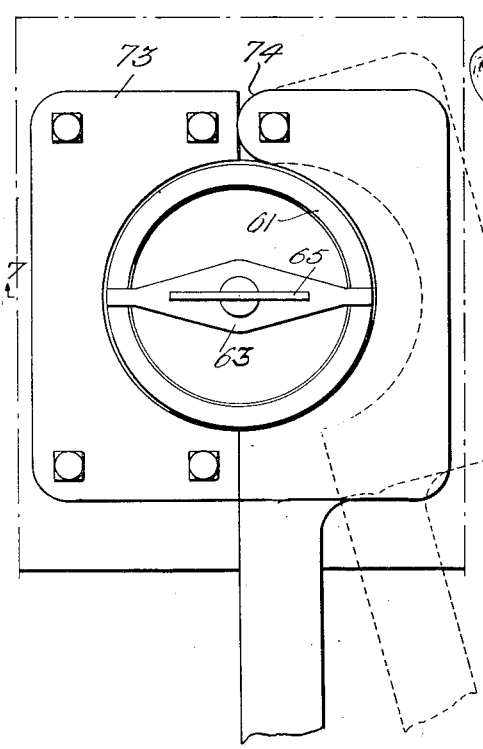
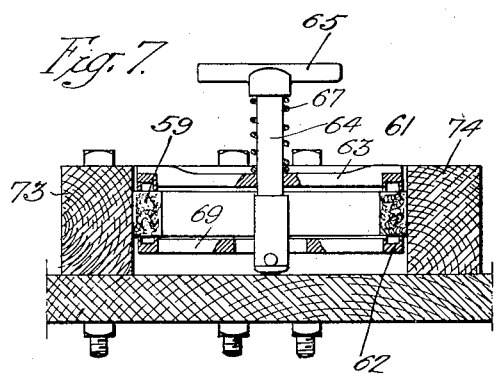

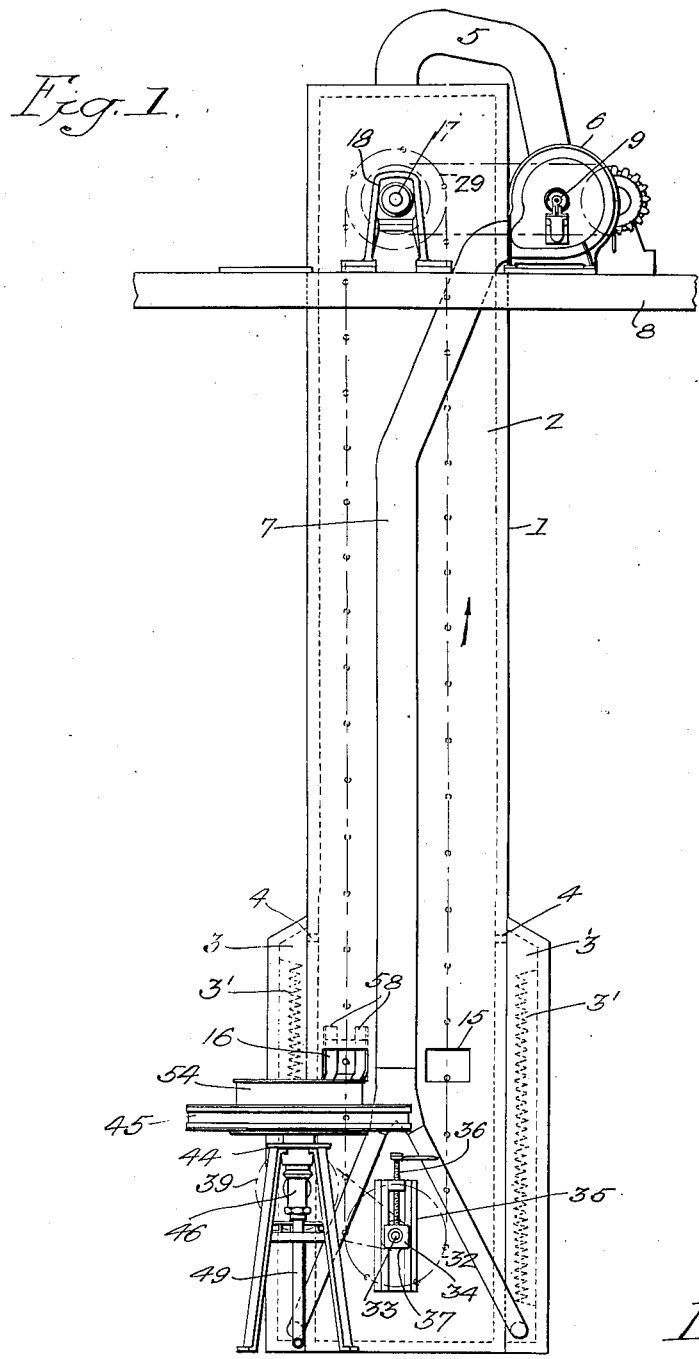

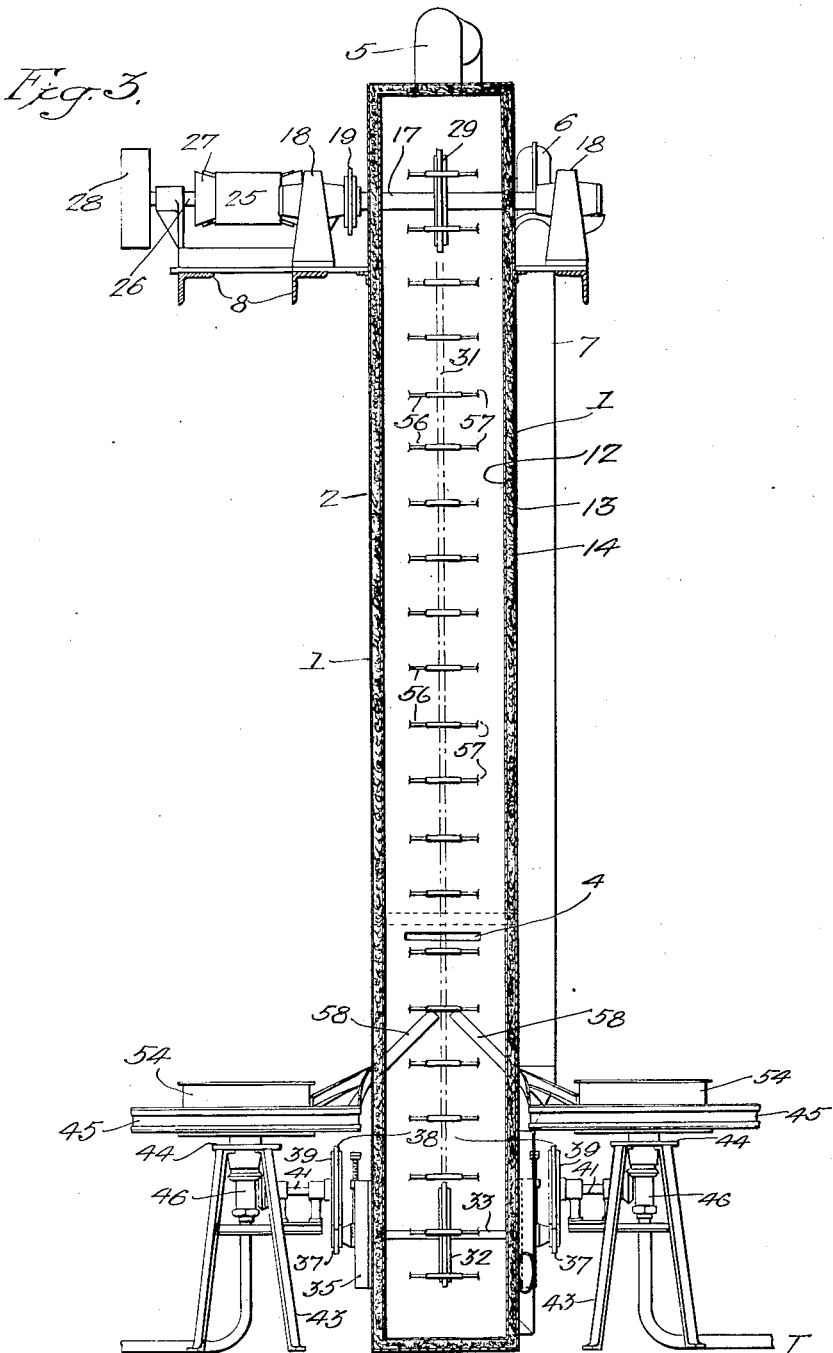

Jan. 30, 1934.             F. H. BENGE             1,945,412

MECHANISM FOR TREATING LAMINATED BODIES

Original Filed April 9, 1929     5 Sheets-Sheet 4

Inventor:-
Frank H. Benge
by his Attorneys.
Howson & Howson

Jan. 30, 1934.  F. H. BENGE  1,945,412
MECHANISM FOR TREATING LAMINATED BODIES
Original Filed April 9, 1929   5 Sheets—Sheet 5

Inventor:
Frank H. Benge
by his Attorneys.
Howson & Howson

Patented Jan. 30, 1934

1,945,412

UNITED STATES PATENT OFFICE 1,945,412

MECHANISM FOR TREATING LAMINATED BODIES

Frank H. Benge, Bridgeport, Pa., assignor to Continental-Diamond Fibre Company, Newark, Del., a corporation of Delaware Application April 9, 1929, Serial No. 353,794
Renewed July 13, 1933

6 Claims. (Cl. 18—6)

This invention relates to improvements in processes and mechanism for treating gumbonded laminated articles, such as gear blanks, and relates more particularly to improvements in processes for making such articles in which a synthetic resin, such as a phenolic condensation product, phthalic anhydride resin, or urea resins, is used as the bonding medium.

In forming laminated articles of this sort, it is customary to build up a blank of appropriately shaped elements constituting the laminations, which elements have been cut from fabric, paper or other suitable sheet material impregnated with a soluble synthetic resin, these elements being bound together by means of thread or the like for transfer to the molding machines in which, under heavy pressure and heat, the laminated structure is compressed and the resin converted to its hard insoluble final state.

It is the principal object of the present invention to provide means for economizing this process by eliminating the necessity for tying the elements together, and by so uniting the elements prior to the final compression and forming operation as to make this operation a more economical one.

The finished product has the further advantage of being free from the undesirable appearance created by the binding strings which formerly remained in the finished article.

The invention further resides in the provision of certain novel apparatus for practicing my invention, as hereinafter set forth and as illustrated in the attached drawings, in which:

Figure 1 is a side elevation of drying apparatus made in accordance with the present invention;

Fig. 2 is a plan view of the apparatus shown in Fig. 1;

Fig. 3 is a section on the line 3—3, Fig. 2;

Fig. 6 is an enlarged top view of one of the elements of the apparatus;

Fig. 7 is a section on the line 7—7, Fig. 6;

Fig. 8 is a perspective view showing one of the hanger links of the drier chain;

Figure 4:
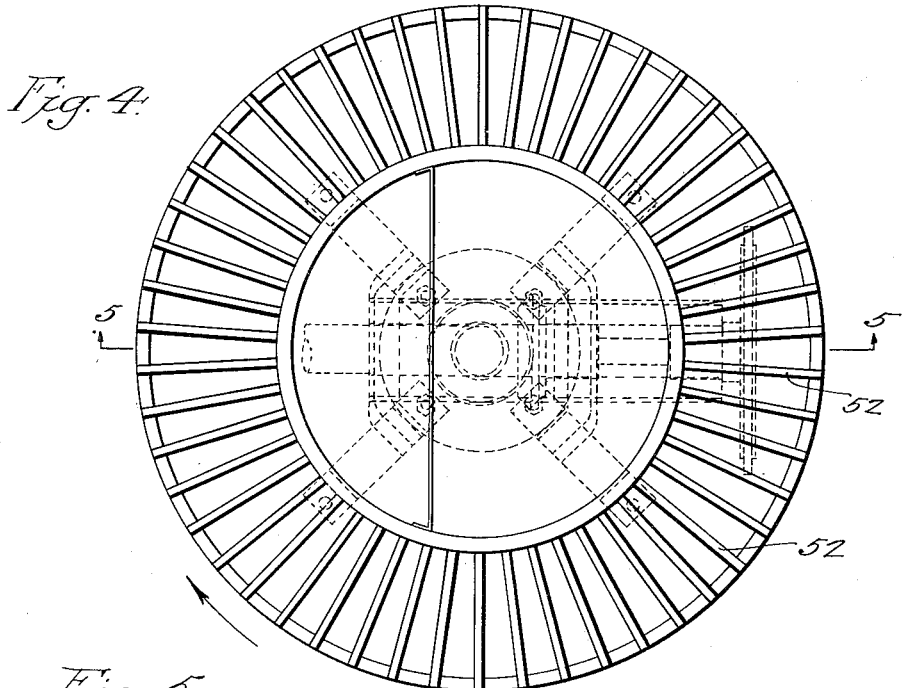
Fig. 4 is a plan view of one of the cooling tables.

Referring to the drawings, a preferred form of apparatus by means of which the present invention may be practiced comprises a housing 1 enclosing a main vertical chamber 2, and at the bottom and on opposite sides thereof chambers 3, 3 which communicate with the main chamber 2 through transverse slots 4. From the upper end of the chamber 2, a suitable duct 5 extends to the intake side of a blower 6, the discharge port of which is connected through a pipe 7 with the bottoms of the two chambers 3, 3, as shown in Fig. 1. The chambers 3, 3 contain heating elements 3', 3' which may be electrically actuated. The blower 6 driven as hereinafter set forth is adapted to draw air or gas from the upper end of the housing and to project this air into the bottoms of the chambers 3, 3 from the tops of which the air is projected through the slots 4 into the lower part of the main chamber 2, from which point it passes upwardly to the exhaust at the top. The blower 6 is mounted on a suitable supporting structure 8 adjacent the top of the housing 1, and the shaft 9 of the blower carries a pulley 11 by means of which the blower may be connected with a suitable source of power.

As shown in Fig. 3, the housing 1 preferably is of double wall construction, the inner wall 12 being insulated from the outer wall 13 by means of asbestos or other suitable insulating material 14. At the lower end, the housing is provided in each side with a pair of side openings 15 and 16 for a purpose hereinafter set forth.

Extending transversely through the upper end of the housing 1 is a shaft 17, this shaft being journaled in bearings 18, 18 on the supporting structure 8. Exteriorly of the housing, the shaft 17 carries a sprocket 19 which is connected through a chain 21 with a sprocket 22 secured to one end of a transverse shaft 23 journaled in the sides of a transmission case 24 supported on the structure 8, as shown in Fig. 2. The shaft 23 is operatively connected through a belt 25 with a shaft 26 also journaled in the casing 24, each of the shafts 23 and 26 having thereon a pair of adjustable cone pulleys 27, 27 upon which the belt 25 operates and which by their relative adjustment provide for varying the speed ratio between the shafts 23 and 26. The shaft 26 carries at one of its extremities and on the exterior of the casing 24 a pulley 28 by means of which the shaft may be connected to a suitable source of power supply.

Figure 5:
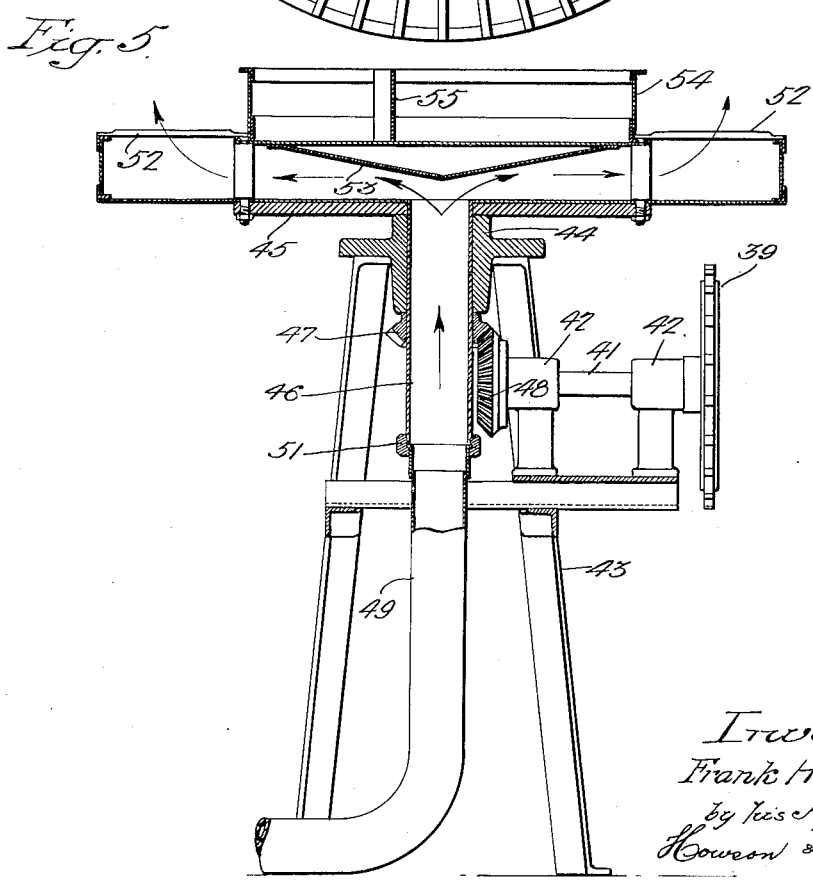
Fig. 5 is a view on the line 5—5, Fig. 4.

In the interior of the housing 1, the shaft 17 carries a sprocket 29 which through a vertical chain 31 is connected with a sprocket 32 on a shaft 33 extending transversely through the lower end of the housing. The shaft 33 is journaled in bearings 34 slidably mounted between vertical guides 35 on opposite sides of the housing, each of the bearings being supported by and being vertically adjustable through the medium of a screw 36, as shown in Fig. 1. By means of these adjustable bearings 34, the tension of the chain 31 may be regulated. Each end of the shaft 33 carries a sprocket 37 which through a chain 38 is connected with a sprocket 39 carried in each instance upon the end of a shaft 41 journaled at 42 on a pedestal 43, these pedestals being located as shown in Fig. 3 adjacent opposite sides of the housing 1. Each of these pedestals 43, as shown in Figs. 4 and 5, has at the top a vertical bearing member 44 on which is supported a rotatable head 45 and in which is journaled a hollow shaft 46 which depends from the head 45 and communicates with the hollow interior of the latter. Below the bearing 44, this shaft 46 carries a bevel pinion 47 which meshes with a bevel gear 48 on the inner end of the shaft 41, and the lower end of the hollow shaft 47 communicates with a stationary duct 49 which extends to a suitable source of supply of unheated or cool air. A suitable joint 51 is provided between the lower end of the shaft 47 and the upper end of the duct 49 to provide for the rotation of the shaft 47.

Each of the heads 45 is substantially cylindrical in form, and the peripheral portion thereof is open at the top and is provided with a series of radial bars 52 which constitute a grid support for articles deposited thereon, as hereinafter set forth. It will be noted that in the interior thereof, the head 45 is provided with an inverted conical baffle 53 which directs cool air passing upwardly through the shaft 47 outwardly and into the open top peripheral portions, as indicated by the arrows in Fig. 5. At the top of the head and in the central closed portion thereof, I provide a cylindrical container 54 the interior of which is divided by a partition 55 into two compartments for a purpose hereinafter set forth.

As illustrated in Figs. 3 and 8, certain of the links of the chain 31 are provided with transverse rod-like extensions 56, the extremities of which are flanged as indicated at 57. In the downward run of the conveyer, the extremities 56 of each of these links pass between a pair of upwardly and inwardly inclined predeterminedly spaced and parallel angle bars 58, these two pairs of bars diverging downwardly and passing outwardly through the openings 16 at the opposite sides of the housing. The outer ends of these spaced pairs of bars, as shown in Figs. 2 and 3, turn transversely and terminate immediately above the gridded peripheral portions of the heads 45 respectively. Each of these pairs of bars 58 is adapted to constitute a conveyer or chute in the upper end of which articles are deposited, as hereinafter set forth and down which these articles slide onto the rotating tables or heads 45. It will be noted that the openings 15 on the opposite sides of the housing 1 are positioned directly opposite the run of the conveyer chain 31.

Figure 9:
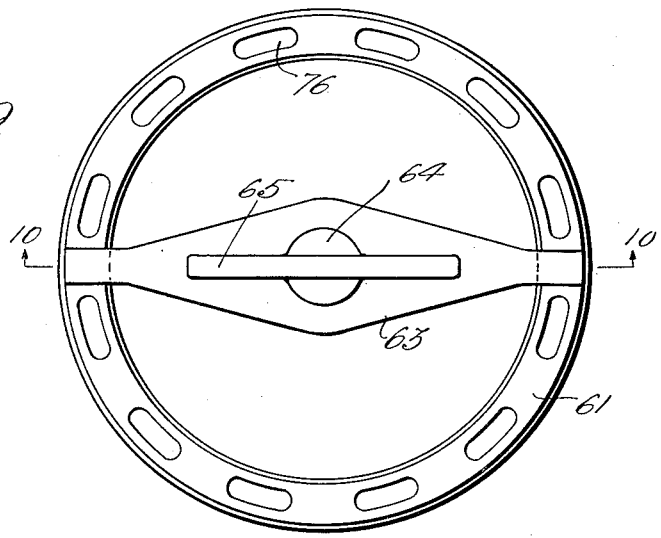
Fig. 9 is a top view of a preferred form of clamp.
Figure 10:
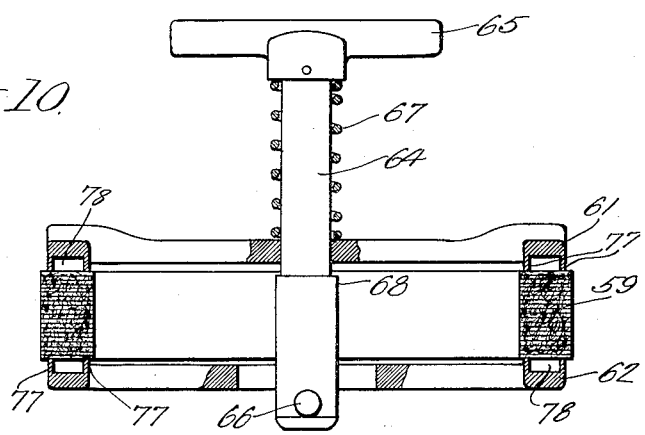
Fig. 10 is a section on the line 10—10, Fig. 9.
Figure 11:
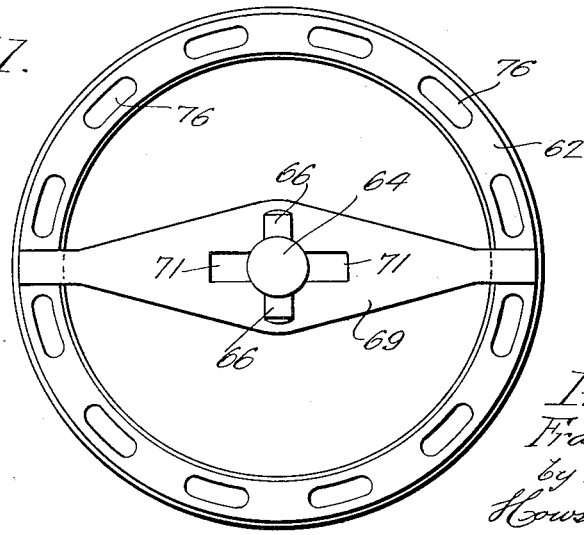
Fig. 11 is an inverted plan view of the clamp.

Referring now to Figs. 9, 10 and 11, I have illustrated therein a desirable form of clamp to be used in connection with an annular laminated body or article of the class to which the present invention relates. The article itself, which in the present instance is a gear blank of annular form, is shown in transverse section in Fig. 10, in which it is designated by the reference numeral 59. In the preferred process, this blank is initially made up of a plurality of segmental flat strips of fabric impregnated with a synthetic resin in its soluble stage, these segments being laid in face to face relation and one above the other to form the annular blank. To hold these segmental sectional laminæ together, I employ in accordance with the present invention a clamp consisting in the present instance of upper and lower annular elements 61 and 62 respectively which are adapted to engage in opposition to each other the upper and lower faces of the annular blank 59. In order to hold the elements 61 and 62 together, I provide on the element 61 a cross bar 63 in which is mounted for longitudinal and rotary movement a rod 64 having at its outer end a handle element 65 and at its inner end a transverse pin 66. A spring 67 is provided between the outer surface of the cross bar 63 and handle 65 which normally resiliently holds the rod 64 in an elevated position in which the under side of the cross bar 63 is engaged by a shoulder 68 on the rod 64 which limits the upward movement. The other clamping element 62 is also provided with a cross bar 69 which has a central aperture for passage of the rod 64 and extending radially therefrom slots 71 which provide for passage through the cross bar 69 of the pin 66.

In order to provide ample circulation of air to the annular laminated article that is held between the upper and lower elements 61 and 62, the elements or clamping rings are constructed with a plurality of ventilating holes 76 arranged in spaced relationship around the periphery thereof. Referring to Fig. 10, it is noted that the rings are further provided with flanges 77, thus positioning the body of the ring away from the annular blank and affording free circulation of air around the ring in the duct 78 so formed and through the ventilating holes 76.

In assembling the clamp upon the laminated blank 59, the rod 64 is forced inwardly so that the pin 66 passes through the slot 71, after which the rod is given a quarter turn which brings the pin 66 into the position shown in Fig. 11, thereby retaining the lower end of the rod in the cross bar 69 against the tendency of the spring 67 to elevate the bar. The clamping elements 61 and 62 are thereby held together against the opposite sides of the laminated annulus 59 with a force depending upon the strength of the spring 67.

In practicing this invention, sufficient of the elements of which the laminated annulus 59 is composed is assembled in the clamp to afford a finished blank of the desired thickness. The clamp with the annulus in position therein is then passed through the aperture 15 at either side of the housing 1 and placed upon a link extension 56, this operation being accomplished by holding the clamp handle 65 in the hand and moving the entire assemblage axially over one of the extensions with the extension projecting through an opening in the bottom of the clamp. It will, of course, be obvious that the enlarged flanges 57 of the extensions will limit the outward movement of the assemblage on the extension and thus insure against accidental dislodgment during passage through the heating chamber. The conveyer 31 is operated in the direction indicated by the arrow in Fig. 1 so that the clamps with the assembled blanks are elevated to the top of the housing 1 and are then carried downwardly on the other run of the conveyer. The temperature in the housing is maintained at say 400° F., and the conveyer is operated at a rate of speed such that the blanks in the clamps are sufficiently heated to cause the still soluble synthetic resin with which the individual laminations are impregnated to become tacky. A temperature of 400° F. from four to seven minutes will usually suffice for this purpose. During this time, it will be understood that air is circulated from the top of the housing downwardly through the ducts 5 and 7 to the bottoms of the heating chambers 3, and from these chambers a blast of heated air is projected through the slots 4 directly onto the clamps as they pass both upwardly and downwardly with the conveyer. As the clamps move downwardly on the conveyer, they are intercepted by the downwardly and outwardly inclining rails 58 which both support and outwardly move the clamps so that they are removed from the downwardly moving link extensions 56 and with the laminated annulus held thereby guided outwardly through the apertures 16 in the housing and onto the rotating tables or heads 45.

The cool air discharging against the rotary table and striking the laminated article held in the clamp causes the synthetic resin to dry and harden, with the result that the strips constituting the laminations of the aforesaid article are cemented together and adhere firmly to each other so that when the clamp is removed, the body remains intact.

Before removing the clamp, however, it is desirable, in order to insure proper alignment of the laminations, to subject the laminated body while still in the clamp to the action of a press which is designed to completely embrace the article, and by pressure against the outer periphery to insure a proper relative positioning of the laminæ. Such clamp I have illustrated as mounted on a bracket extension 72 on the housing 1 intermediate the tables 45. The clamp as illustrated in Figs. 6 and 7 comprises a fixed jaw or abutment 73 having a semicircular recess in one face formed on a radius corresponding to the radius of the laminated article held by the clamp. The press further comprises a pivoted jaw 74 opposing the fixed element 73 and having a complementary semicircular recess which, when the jaw 74 is in abutment with the member 73 as shown in full lines in Fig. 6, forms a circle conforming in size to the circumferential dimensions of the said laminated blank. With the jaw 74 in the retracted position illustrated in broken lines in Fig. 6, the clamp with the laminated article held thereby is removed from the tables 45 and is placed in this press 73—74, the jaw 74 being brought inward toward the other jaw and thereby pressing against the sides of the laminated article and insuring a proper form in the latter.

In Fig. 7, the jaws are shown as bearing against the sides of the laminated article. While the article is so held, the shaft 64 is rotated to bring the pin 66 into alignment with the slot 71, and the upper portion of the clamp thus being released is removed and is placed by the operator in one of the receptacles formed by the partition 55 of the container 54. The clamping jaw 74 is then released and the laminated article is removed intact and in condition for the further operation which converts the synthetic resin binder to its final hard insoluble and infusible state. Following removal of the laminated article from the press 73—74, the lower portion 62 of the clamp is removed and placed in the other compartment of the container 54, the clamping parts being then separated and readily available for further use.

A decided economy is effected by the practice of the present invention. The use of the clamp in conjunction with an initial heating of the laminated body entirely eliminates the requirement for tying the elements of the laminated body together. This tying operation is a relatively long and tedious one requiring employment of considerable labor.

By means of a device forming the subject of a further application Serial No. 438,879, filed March 25, 1930, for Method of and apparatus for producing segmental rims, the clamp is applied to the elements forming the laminated article, while the said elements remain in the die which cuts them from the stock sheets so that the clamping operation is incidental to the cutting operation and is an extremely simple and uncomplicated operation. Thereafter the operations are entirely mechanical with the exception of the removal of the clamp which also is an extremely simple operation requiring no special skill.

A further decided economy is also realized in the use of a clamp such as I have illustrated in which the opposed clamping elements are resiliently held together against the opposite faces of the laminated article. During the initial heating operation in which the synthetic resin is melted to the extent affording the required adhesiveness, there is a tendency for the entire laminated body to contract as to thickness by reason of the spreading out of the binder over the surfaces of the various laminations, and this contraction is aided and compensated for by the pressure of the clamping spring in obvious manner. At the end of the heating operation, therefore, the thickness of the laminated body will have appreciably decreased, and it accordingly is unnecessary to apply as great pressure in the final resin-converting operation in order to give the laminated body the desirable compactness of form. The economy may be realized either in a saving in the power required for the final operation or in the weight and size of the press used for this final operation.

I claim:

1. Mechanism for treating laminated bodies comprising a housing enclosing a heating chamber, a conveying system mounted therein, and rotatably arranged cooling tables cooperating therewith.

2. Mechanism for treating laminated bodies comprising a housing enclosing a heating chamber, a conveying system mounted therein and rotatably arranged cooling tables cooperating therewith provided with a blower system whereby air is forced through a series of radial slots located in the top of the tables to cool the laminated bodies.

3. Mechanism for treating laminated bodies comprising a housing enclosing a heating chamber, a conveying system mounted therein, detachable clamping devices for securely holding together the laminated bodies, and rotatably arranged cooling tables cooperating therewith.

4. Mechanism for the treatment of laminated bodies comprising a housing containing a heating chamber, a conveyer mounted for movement in said chamber, the housing having openings at opposite sides to admit said bodies to be received by said conveyer, the housing having additional openings in its opposite sides for the discharge of said bodies at the end of the heating operation, a chute projecting through each of the last-named openings into the chamber to disengage said bodies therefrom, a rotating table at each side of said housing to receive the laminated articles through said chutes, and means for supplying a cooling medium to said table.

5. Mechanism for treating laminated bodies comprising heating means, cooling means, and means for clamping the body in the direction of lamination thereof while passing the same successively through said heating and cooling means comprising clamping elements engaging opposite end faces of the bodies and means constantly urging said elements toward one another.

6. Mechanism for treating laminated bodies comprising heating means, and cooling means to substantially set the body following the heating thereof, clamping means for the body, compressing the body in the direction of lamination thereof while passing the same successively through said heating and cooling means, and a forming means to engage the body and re-shape the same upon its passage from said cooling means to thereby restore the body to its normal shape following distortion thereof as the result of temperature changes.

FRANK H. BENGE.